United States Patent
Kuzeci (10) Patent No.: US 10,354,807 B2
(45) Date of Patent: Jul. 16, 2019

(54) METHOD FOR PRODUCING ELECTRODE FOILS FOR CAPACITORS, ELECTRODE FOILS, AND CAPACITORS COMPRISING SAID ELECTRODE FOILS

(71) Applicant: Epcos AG, München (DE)

(72) Inventor: Erkan Kuzeci, Ceranova (IT)

(73) Assignee: Epcos AG, München (DE)

( * ) Notice: Subject to any disclaimer, the term of this patent is extended or adjusted under 35 U.S.C. 154(b) by 0 days.

(21) Appl. No.: 15/529,021

(22) PCT Filed: Dec. 7, 2015

(86) PCT No.: PCT/EP2015/078868
§ 371 (c)(1),
(2) Date: May 23, 2017

(87) PCT Pub. No.: WO2016/091824
PCT Pub. Date: Jun. 16, 2016

(65) Prior Publication Data
US 2017/0271086 A1    Sep. 21, 2017

(30) Foreign Application Priority Data

Dec. 9, 2014 (DE) .................. 10 2014 118 222

(51) Int. Cl.
*H01G 9/048* (2006.01)
*H01G 9/042* (2006.01)
(Continued)

(52) U.S. Cl.
CPC ............ *H01G 9/048* (2013.01); *B21D 33/00* (2013.01); *H01G 9/0029* (2013.01);
(Continued)

(58) Field of Classification Search
CPC ...... H01G 9/048; H01G 9/145; H01G 9/0029; H01G 9/042; B21D 33/00
See application file for complete search history.

(56) References Cited

U.S. PATENT DOCUMENTS 2,146,029 A * 2/1939 Schimkus ............ H01G 9/0032
205/201
4,228,481 A    10/1980 DiNicola et al.
(Continued)

FOREIGN PATENT DOCUMENTS

CH    254657 A    5/1948
DE    690445 A    4/1940
(Continued)

OTHER PUBLICATIONS

International Search Report corresponding to International Patent Application No. PCT/EP2015/078868, European Patent Office, dated Mar. 8, 2016; (2 pages).
(Continued)

*Primary Examiner* — David M Sinclair
(74) *Attorney, Agent, or Firm* — Nixon Peabody LLP (57) ABSTRACT

The invention relates to a method for producing electrode foils (1) for capacitors (10), comprising the method steps of: A) providing a metal foil (1), B) transferring microstructures (2) located on a stamping die onto a main surface of the metal foil by a reforming process.

18 Claims, 5 Drawing Sheets

(51) Int. Cl.
  *B21D 33/00* (2006.01)
  *H01G 9/00* (2006.01)
  *H01G 9/045* (2006.01)
  *H01G 9/055* (2006.01)
  *H01G 9/07* (2006.01)
  *H01G 9/145* (2006.01)

(52) U.S. Cl.
  CPC .......... *H01G 9/0032* (2013.01); *H01G 9/042* (2013.01); *H01G 9/045* (2013.01); *H01G 9/055* (2013.01); *H01G 9/07* (2013.01); *H01G 9/145* (2013.01)

(56) References Cited

U.S. PATENT DOCUMENTS

| | | | | |
|---|---|---|---|---|
| 6,168,100 | B1* | 1/2001 | Kato | B22F 1/0007 241/1 |
| 9,637,825 | B2* | 5/2017 | Shin | C23C 18/16 |
| 2004/0112421 | A1* | 6/2004 | Spivack | H01G 9/2027 136/256 |
| 2004/0240155 | A1* | 12/2004 | Miltich | H01G 9/02 361/512 |
| 2005/0095482 | A1* | 5/2005 | Garner | C04B 35/486 429/482 |
| 2008/0285210 | A1* | 11/2008 | Oh | H01G 9/0032 361/525 |
| 2008/0292805 | A1* | 11/2008 | Tamura | B81C 99/009 427/443.2 |
| 2011/0174040 | A1* | 7/2011 | Meng | B81C 1/00071 72/200 |
| 2011/0281170 | A1* | 11/2011 | Mitsuda | H01G 11/28 429/233 |
| 2012/0219817 | A1 | 8/2012 | Konishi et al. | |
| 2013/0070389 | A1* | 3/2013 | Kim | H01G 11/28 361/502 |
| 2015/0003033 | A1* | 1/2015 | Liu | H01G 11/26 361/820 |
| 2016/0196932 | A1* | 7/2016 | Chiem | H01G 11/86 361/502 |

FOREIGN PATENT DOCUMENTS

| | | |
|---|---|---|
| DE | 3005370 A1 | 8/1981 |
| EP | 0034333 A2 | 8/1981 |
| JP | S56-131922 A | 10/1981 |
| JP | H06-145922 A | 5/1994 |
| JP | H06-188158 A | 7/1994 |
| JP | 2007042789 A * | 2/2007 |
| JP | 2014072267 A * | 4/2014 |

OTHER PUBLICATIONS

Becker, E. et al.: "Fabrication of microstructures with high aspect ratios and great structural heights by synchrotron radiation lithography, galv anoforming, and plastic moulding (LIGA process)" Microelectronic Engineering 4, No. 1, 1986, pp. 35-56.

Mappes. T. et al.: "Submicron polymer structures with X-ray lithography and hot embossing" Microsyst Technol (2008) 14, pp. 1721-1725.

Mehne, Ch.: "Großformatige Abformung mikrostrukturierter Formeinsätze durch Heißprägen" Dissertation, Universität Karlsuhe (TH), Fakultät für Maschinenbau, Universitätsverlag Karlsruhe; 2007; (141 pages).

Worgull, M. et al.: "New aspects of simulation in hot embossing" Microsyst Technol (2004) 10, pp. 432-437.

* cited by examiner

METHOD FOR PRODUCING ELECTRODE FOILS FOR CAPACITORS, ELECTRODE FOILS, AND CAPACITORS COMPRISING SAID ELECTRODE FOILS

CROSS-REFERENCE TO RELATED APPLICATIONS

This application is a U.S. National Stage of International Application No. PCT/EP2015/078868, filed Dec. 7, 2015, which claims the benefit of Germany Patent Application No. 10 2014 118 222.7, filed on Dec. 9, 2014, both of which are incorporated herein by reference in their entireties.

Electrode foils for capacitors, for example electrolytic capacitors, must have a surface area that is as large as possible in order to increase the capacitance of the capacitors. The market demand is tending here toward electrolytic capacitors with increasingly higher voltages (up to 1200 $V_f$). At the same time, the metal foils as electrodes must also have a high mechanical resistance, in order to withstand the high speeds of the winding machine during the production of the capacitors.

To increase the surface area of the electrode foils, metal foils, which may for example consist of a valve metal, such as for example aluminum, are treated by means of an electrochemical etching process in such a way that the surface area is increased. This process has the disadvantage that the metal foils can lose up to 30% of their weight during the etching operation, so that their mechanical resistance is reduced in comparison with unetched foils. At the same time, the electrochemical etching process leads to a high consumption of acids and causes large amounts of liquid, acidic waste.

The etching operation leads to irregular structures and channels on the surface of the metal foils. In order to allow etching of the metal foils that is as controlled as possible, often high-purity metal foils are used, having a purity of >99%, for example aluminum foils which have a high crystalline texture, in particular a high cubic texture ($\{100\}<100>$), on their surface. This cubic texture is important because the etching takes place preferentially along the crystallographic <001> direction. The production of the metal foils with a high crystalline texture, in particular cubic texture, is however very time-consuming and costly and requires complex rolling steps at different temperatures, which ultimately by an annealing process can lead to the formation of a largely cubic texture.

One object of the present invention is to provide a method for producing electrode foils for capacitors that is improved with respect to the aforementioned disadvantages. Further aspects of the present invention are directed at improved electrode foils for capacitors and also at capacitors comprising said electrode foils.

The subject of one embodiment of the present invention is a method for producing electrode foils for capacitors, comprising the method steps of:
A) providing a metal foil,
B) transferring microstructures located on a stamping die to a main surface of the metal foil by a reforming process.

Reforming is understood here as meaning any process in which the metal foil is brought plastically into another form. In particular, reforming also refers to an embossing operation, in which the microstructures located on a stamping die are transferred to a main surface of the metal foil by means of pressure.

During the reforming operation, the embossing, the stamping die may for example be pressed against the main surface of the metal foil, or conversely the metal foil, for example together with a substrate supporting the foil, may be pressed against the stamping die. Also possible is a relative movement of the stamping die and the metal foil toward one another during the reforming operation.

By contrast with conventional etching processes, no waste, in particular no liquid waste, occurs during the transfer of the microstructures from the stamping die to the main surface of the metal foil using a reforming process. A further advantage is that, by contrast with the etching operation, the metal foil does not lose any substance, and consequently can be mechanically more stable than etched metal foils.

The microstructures transferred by means of the reforming process, for example embossing, are in particular structures on the surface of the metal foil, for example depressions and elevations, which have dimensions in the range between 0.1 μm and 100 μm, preferably between 0.1 μm and 20 μm, more preferably between 0.7 μm and 5 μm. These microstructures particularly advantageously bring about an increase in the specific surface area of the metal foil, so that capacitors with these metal foils as electrodes have an increased capacitance.

According to a further embodiment of a method according to the invention, a metal foil comprising or consisting of a valve metal may be used in method step A).

Valve metals, in which an oxide layer of the metal can be produced on the metal foil by means of electrochemical processes, for example anodic oxidation, are particularly well suited as electrodes for capacitors because the oxide layer of the metal acts as a dielectric. The oxide layer determines the dielectric strength of the capacitor, it also being possible in particular to use the thickness of the oxide layer to set the rated voltage of the capacitor in a particularly easy way.

Examples of valve metals on which an oxide layer of the metal can be produced by means of electrochemical processes are aluminum, tantalum, niobium, manganese, titanium, bismuth, antimony, zinc, cadmium, zirconium, tungsten, tin, iron, silver and silicon, preferably aluminum, tantalum and niobium and particularly more preferably aluminum.

Particularly preferred as a valve metal is aluminum, because aluminum metal foils can be used particularly well as electrodes for electrolytic capacitors, in particular aluminum electrolytic capacitors.

In the case of a method according to the invention, it is also possible according to a further variant that, in a method step C) following method step B), a metal oxide layer can be produced on the metal foil as a dielectric. As already described further above, this may take place by means of electrochemical processes, in particular anodic oxidation, if metal foils comprising or consisting of a valve metal are used.

On account of the increased stability of metal foils produced by means of the method according to the invention, stable oxide layers can be produced particularly easily as a dielectric on these metal foils, for example for high-voltage applications with a surface area increased by up to 20 times in comparison with foils that have not undergone a reforming process.

In method step B) of a method according to the invention, the metal foil may in particular be positioned between two stamping dies, and consequently the microstructures located on both stamping dies can be transferred to the two main surfaces of the metal foil by a reforming process, for example pressing.

By means of such a stamping process, both main surfaces of the metal foil can be provided particularly easily with an increased surface area and with microstructures by embossing.

However, it is also possible that only one of the two stamping dies has the microstructures, so that the microstructures are only transferred to one main surface by this pressing operation.

According to another variation of a method according to the invention, this method may be designed as a continuous method, in method step B) the metal foil being passed between two rotating rolls as stamping dies and the microstructures thereby transferred onto at least one or both main surfaces of the metal foil.

By means of such a continuous "roll-to-roll" method, long strips of the metal foil can be embossed particularly easily in a continuous process without interruption by means of a reforming process, it being possible for the microstructures to be transferred to one or both main surfaces of the metal foil particularly easily, quickly and consequently also inexpensively. Coming into consideration as the material for the roll are for example ceramic materials, special steels or else metals such as nickel or chromium, on which the microstructures have been produced by means of laser ablation with femtosecond lasers. These lasers can produce microstructures with a size of <5 μm.

These very short laser pulses (<100 ns) cause such a high energy density that the material of the rolls sublimates without the material melting, so that tiny microstructures with high aspect ratios can be produced on the rolls. Furthermore, the laser ablation also allows the transfer of microstructures onto curved surfaces, such as for example rolls, in a particularly easy way.

Furthermore, the stamping dies by means of which the metal foils are embossed may also be produced by using the LIGA process. LIGA is a German acronym standing for lithography, electroforming and molding. This process can be used to also produce microstructures on stamping dies in a three-dimensional arrangement with a high aspect ratio.

During the LIGA process, a photosensitive monomer, which is typically acrylate-based, can be bonded onto an electrically conductive solid substrate. This monomer layer is then irradiated with high-energy beams, for example X-ray or UV beams, through a mask, which defines the microstructures to be obtained, the irradiated regions of the monomer layer polymerizing, while the monomers are retained in the non-irradiated regions (negative resist). By means of a chemical developer solution, the non-polymerized monomers can then be removed, so that a polymer layer provided with the microstructures remains on the electrically conductive substrate. In a subsequent electroplating process, metals such as cobalt or nickel can then be introduced for example into the empty voids of the polymerized layer. In a final step, the structured polymer is then removed, leaving a structured metal layer, which can be used as a stamping die for the methods according to the invention. With respect to the LIGA process, reference is made for example to the publication E. W. Becker, W. Ehrfeld. P. Hagmann, A. Mana, D. Munchmeier: "Fabrication of microstructures with high aspect ratios and great structural heights by synchrotron radiation lithography, galvano forming, and plastic molding (LIGA process); Microelectronic Engineering 4", Number 1, 1986, pages 35 to 56. This LIGA process allows in particular the production of metal structures with a height of several 100 μm that have dimensional deviations of less than 0.1 μm. Cobalt, nickel, copper and also nickel/iron alloys can be used as possible metals for the stamping dies for application in the method according to the invention.

An example of a negative resist that can be used in a LIGA process is the photoresist SU-8, which has as the monomer component an epoxy resin with the following structure, comprising a total of eight epoxy groups in the molecule:

This monomer can be dissolved in a solvent, for example γ-butyrolactone or cyclopentanone, a photoacid being used as the photosensitive component, releasing an acid when irradiated for example with UV light of a wavelength of 365 nm. This acid may be for example triarylsulfonium hexafluoroantimonate, which under the effect of irradiation initiates a polymerization in the epoxy resin. 1-Methoxy-2-propanol acetate may be used as the developer.

With respect to conventional hot embossing processes, reference is made to the full content of the following publications: T. Mappes, M. Worgull, M. Heckele, J. Mohr "Submicron polymer structures with X-ray lithography and hot embossing", Microsyst. Technol. (2008), 14: 1721-1725; M. Worgull, M. Heckele "New aspects of simulation in hot embossing", Microsyst. Technol. (2004), 10: 432-437; Christian Mehne: "Großformatige Abformung mikrostrukturierter Formeinsätze durch Heißprägen" [Large-format replication of microstructured mold inserts by hot embossing]; dissertation, Universitat Karlsruhe (TH), Faculty of Mechanical Engineering, Universitatsverlag Karlsruhe 2007.

In the case of a further embodiment of a method according to the invention, in method step B) regular microstructures can be produced in particular.

The microstructures may in this case form structures with a defined depth or elevation in the surface, there likewise being defined distances between individual microstructures on the surface of the metal foil. The elevations or depressions in the surface for the microstructures and also the distances of adjacent microstructures from one another may vary by a maximum of 15%, preferably a maximum of less than 10% and preferably a maximum of less than 5%. In particular, the deviations may also only be of an order of magnitude of 0.1 μm. Defined, regular microstructures can be produced particularly easily in the metal foils by reforming processes, such as embossing, and consequently allow a particularly defined method for specifically increasing the surface areas of the electrode foils without running the risk of ruptures through the metal foil. This is a great advantage in comparison with the chemical etching process that is conventionally used.

The microstructures may in particular also comprise a multiplicity of depressions in the metal foil. When the main surface of the metal foil is viewed from above, these depressions may assume either oval, round or polygonal forms. In cross section, the depressions may in particular also have widths that narrow toward the interior of the metal foil or remain approximately the same (also see FIGS. 2a and 4b).

It is also possible that in method step B) microstructures that comprise trenches are produced on the surface of the metal foil, the trenches being arranged at defined distances from one another. In particular, in this case trenches with an aspect ratio of at least 4:1 can be produced (aspect ratio=ratio of the depth or height of a structure to its smallest lateral extent, for example the width). In particular, the depth of the trenches may be 20 µm or more and the width of the trenches at most 5 µm. Furthermore, the trenches may also have distances from one another that are at most 5 µm.

The microstructures produced may also comprise microstructures of different forms, for example a combination of trenches and depressions.

It is in this case preferred to produce microstructures with the greatest possible aspect ratios, that is to say the smallest possible size, on at least one main surface of the metal foil, in order to achieve as large a surface area as possible of the electrode foils and consequently an improved capacitance of the capacitors that are provided with the electrode foils.

The elevations of the microstructures may in this case also have small connecting webs between adjacent microstructures, in order for example to increase their mechanical stability. The height or the depressions of the microstructures and their distances from one another may be determined particularly easily by means of scanning electron microscopy, which is familiar to a person skilled in the art.

In the case of the methods according to the invention, in method step B) the stamping dies may in particular be pressed against the metal foil at a temperature from below 600° C., 500° C., or 400° C., to below 320° C., preferably below 200° C., more preferably <100° C., it also being possible for the temperature to be room temperature. As a difference from polymeric substrates, on which microstructures can be produced by means of nanoimprinting or hot embossing, metal foils are not thermoplastic, the inventors having found that in particular at temperatures of <400° C. no alloying effects occur between the metal foil and the metallic stamping die, for example a nickel stamping die.

Furthermore, in method step B) in methods according to the invention the stamping dies and the metal foil may be pressed against one another in a very wide pressure range, depending on the temperature and the embossing device. The inventors have found that, at pressures in the range of 10 to 100 MPa, an embossing of the metal foils works particularly well.

Furthermore, according to a further variant of a method according to the invention, there is the possibility that in method step A) a metal foil with a crystalline texture, that is to say in particular a cubic texture, of <90%, preferably <50%, more preferably without a cubic texture, is provided.

Since the reforming process is a mechanical process involving plastically reforming and deforming the metal foils, it is not absolutely necessary to use metal foils, in particular aluminum foils, with a high cubic texture, along which etching can preferentially take place. Consequently, there is the possibility in the case of embodiments of methods according to the invention of using metal foils that are not subjected to complex rolling processes at different temperatures and annealing procedures in order to produce a high crystalline texture on the surface. Therefore, foils that can be produced at lower cost can also be used in methods according to the invention. In principle, however, foils with a high cubic texture can also be used.

If foils with a high cubic texture are used, the reforming process according to the invention can work better. With conventional etching processes, even the smallest angles of inclination of the cubic texture surface of the metal foils leads to different etching results, but these inclinations of the cubic texture surface are not all that significant in the case of the reforming processes of the present invention.

The crystalline texture, in particular cubic texture, of surfaces of metal foils may be determined for example by means of scanning electron microscopy in combination with electron backscatter diffraction (EBSD). These methods can be carried out with scanning electron microscopes or transmission electron microscopes and allow the spatially resolved determination of the crystal symmetries of the surface of the metal foils. With respect to electron backscatter diffraction, reference is made in particular to the publication by F. J. Humphries: "Review grain and subgrain characterisation by electron backscatter diffraction", Journal of Material Science, Volume 36, No. 16, pages 3833 to 3854, from the year 2001.

Furthermore, in method step A) a metal foil with a purity of >95%, preferably >98%, may be provided, it also being possible for the purities to reach very high values of up to 99.9% to 99.99%.

In method step A), in particular metal foils with a thickness of at least 120 µm, preferably at least 100 µm, most preferably at least 80 µm, may be provided. The inventors have found that, with such minimum thicknesses, particularly cost-effective results are achieved in the case of reforming processes according to the invention.

Also the subject of the present invention are electrode foils that have been produced by the methods according to the invention, and consequently in particular also comprise a metal foil with regular microstructures on at least one main surface. As already described, these microstructures are embossed microstructures and have in particular defined depths or elevations and also defined distances between individual adjacent microstructures. The variation of the heights or the depressions of the microstructures and also their distances from one another may vary in this case by a maximum of 20%, preferably 15%, more preferably 5%. Deviations in the range of 0.1 µm are also possible.

Embodiments of the electrode foils according to the invention may have a thickness of below 100 µm, preferably up to 88 µm, and when used as an electrode foil in aluminum electrolytic capacitors have a capacitance of approximately 0.2 µF/cm$^2$ at a forming voltage of 900 V.

As already described above, it is advantageous if the metal foil comprises a valve metal, in particular the aforementioned metals, preferably aluminum, tantalum or niobium. Aluminum metal foils are preferred in particular for use in aluminum electrolytic capacitors.

The microstructures may in particular comprise trenches with an aspect ratio of at least 4:1. The depth of the trenches may be at least 20 µm and their width may be at most 5 µm, it also being possible for the distance of individual trenches from another to be at most 5 µm.

As described above, the metal foil may comprise a crystalline texture, in particular a cubic texture, of <90%, preferably <80%, or even have no texture at all, because a crystalline surface texture is not necessarily required for a mechanical reforming process.

Before the electrode foils are used in a capacitor, in particular an electrolytic capacitor, a metal oxide layer may be produced over the microstructures as a dielectric, for example by means of anodic oxidation. For example in the case of aluminum electrode foils, this is possible particularly easily by what is known as a forming process, which can in principle be subdivided into four method steps.

In a first step, the pretreatment, aluminum hydroxides are formed by reaction in an aqueous medium, for example a hot water bath. A complex aluminum hydroxide thereby forms, known as the boehmite layer.

This method step is followed by an anodic oxidation of the foil in neutral electrolytes, which transforms the boehmite layer into γ-aluminum and produces a further oxide layer directly by oxidation of metallic aluminum. Since the transformation from metallic aluminum into aluminum oxide also at the same time causes a change in the density of the material (density of aluminum 2.7 g/m$^3$, density of aluminum oxide 3.8 g/cm$^3$), cracks and voids are also produced in the interior of the oxide layer during this method step.

Therefore, in a further, third method step, these defects are first wetted with an electrolyte (known as the depolarization step) and then these defects are healed by means of an anodic polarization, the final, fourth forming step. Depending on the forming voltage, the thickness of the oxide layer produced during the forming may increase, the increase taking place in a ratio of 1 nm/1 volt. For example, a forming voltage of 560 V may then result in a thickness of the oxide layer of about 0.56 μm. A major advantage of the method according to the invention is that the structures are dimensioned specifically for different voltages, i.e. different oxide layer thicknesses, in order that the growing oxide layers cannot lead to a decrease in the specific surface area.

Exemplary embodiments of the invention are to be explained in more detail below on the basis of figures, in which.

Figure 1A:
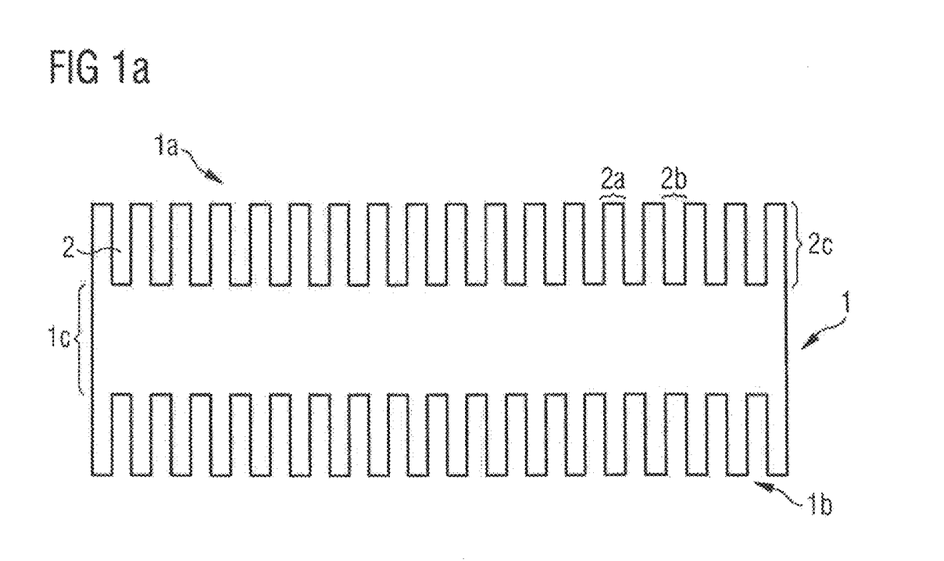
FIG. 1a shows in cross section an electrode foil produced by means of a method according to the invention and comprising microstructures.

FIG. 1a shows in cross section an electrode foil 1 embossed by means of a reforming process according to the invention, the microstructures 2 having been produced on both main surfaces 1a, 1b. It can be seen here that trenches 2 have been formed on both main surfaces, the width of the trenches 2b being of a size similar to the distance 2a of two adjacent trenches from one another. The width of the trenches 2b and the distance 2a between two adjacent trenches may also have different dimensions, the walls of the channels not necessarily having to be perpendicular to the plane of the foil, but may also have a different angle to the plane of the foil. In first experiments, trenches with a depth 2c of at least 20 μm and a width 2b of at most 5 μm and also a distance from one another 2a of at most 5 μm have already been produced by means of the method according to the invention. It can also be seen from FIG. 1a that the thickness of the metal foil is greater than the depth of the microstructures, so that, in the cross section of the foil, there is in the interior 1c of the foil an unembossed region 1c without microstructures, which gives the foil great mechanical stability.

Figure 1B:
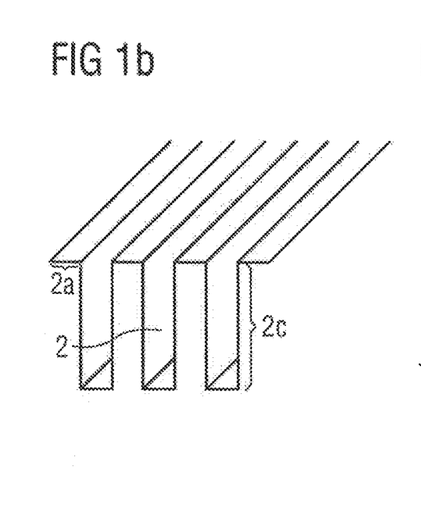
FIG. 1b shows the corresponding microstructures of FIG. 1a in a perspective view.

FIG. 1b shows in a perspective view the profile of the trenches in relation to one another. It can be seen from both FIGS. 1a and 1b that the width of the trenches remains approximately the same toward the interior of the electrode foil.

Figure 1C:
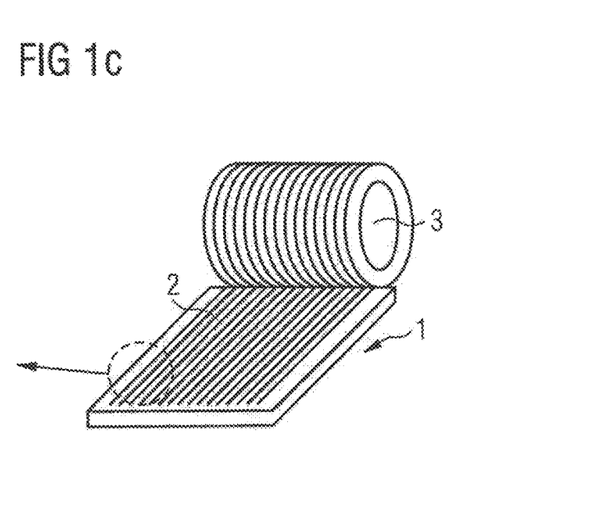
FIG. 1c shows method step B), during which a stamping die is pressed as a rotating roll onto a metal foil, and accordingly the trenches shown in FIGS. 1a and 1b are produced as microstructures.

FIG. 1c schematically shows how the microstructures 2 are transferred to the electrode foil 1 by means of a roll as a stamping die 3.

Figure 2A:
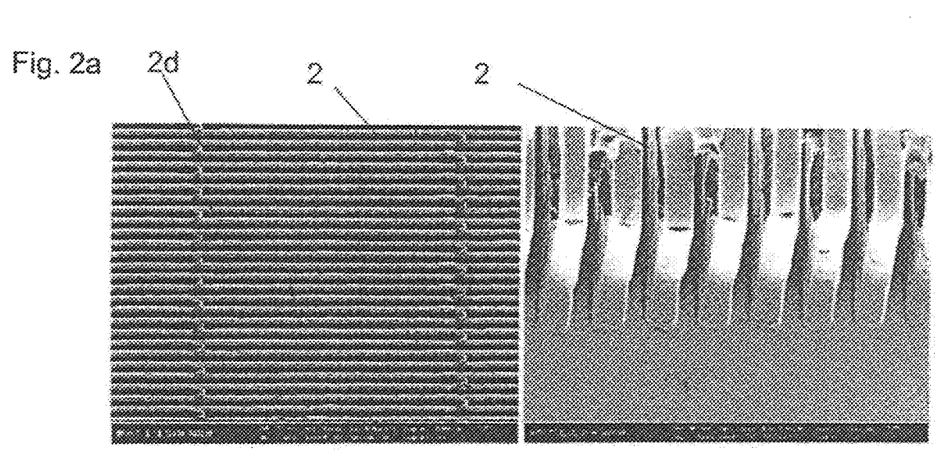
FIG. 2a shows scanning electron micrographs of the trenches.

FIG. 2a shows typical scanning electron micrographs of the trenches 2 of a 120 μm thick aluminum electrode foil, both in plan view and in a perspective view. The regular arrangement of the microstructures can be clearly seen, it also being possible for webs 2d that can in particular provide an increase in the mechanical stability of the microstructures to run between individual trenches. The depth of the trenches is 20 μm and their width is 5 μm. The distance between adjacent trenches is also approximately of the order of magnitude of 5 μm.

Figure 2B:
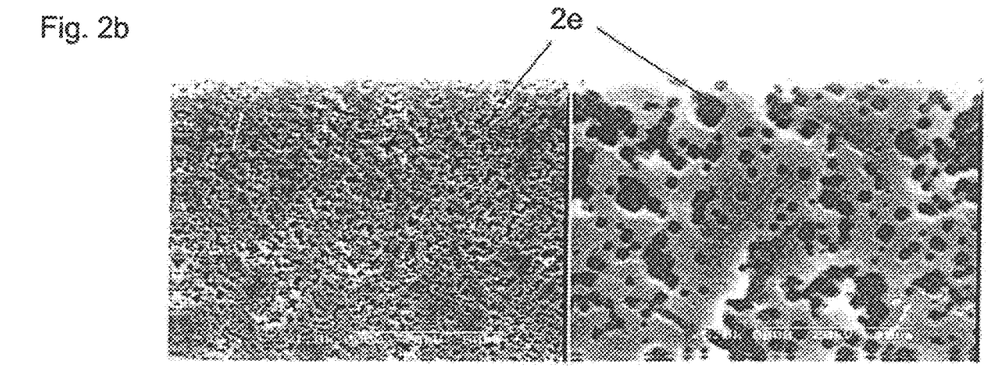
FIG. 2b shows by contrast with FIG. 2a an aluminum foil etched by conventional methods and comprising irregular surface structures.

FIG. 2b shows by contrast with FIG. 2a tunnels 2e, which can be formed in aluminum electrode foils by means of a pre-etching step in the course of conventional etching processes. The irregular arrangement of the tunnels 2e can be clearly seen, in distinct contrast to the regular, defined microstructures of the embossed foils in FIG. 2a.

Figure 3:
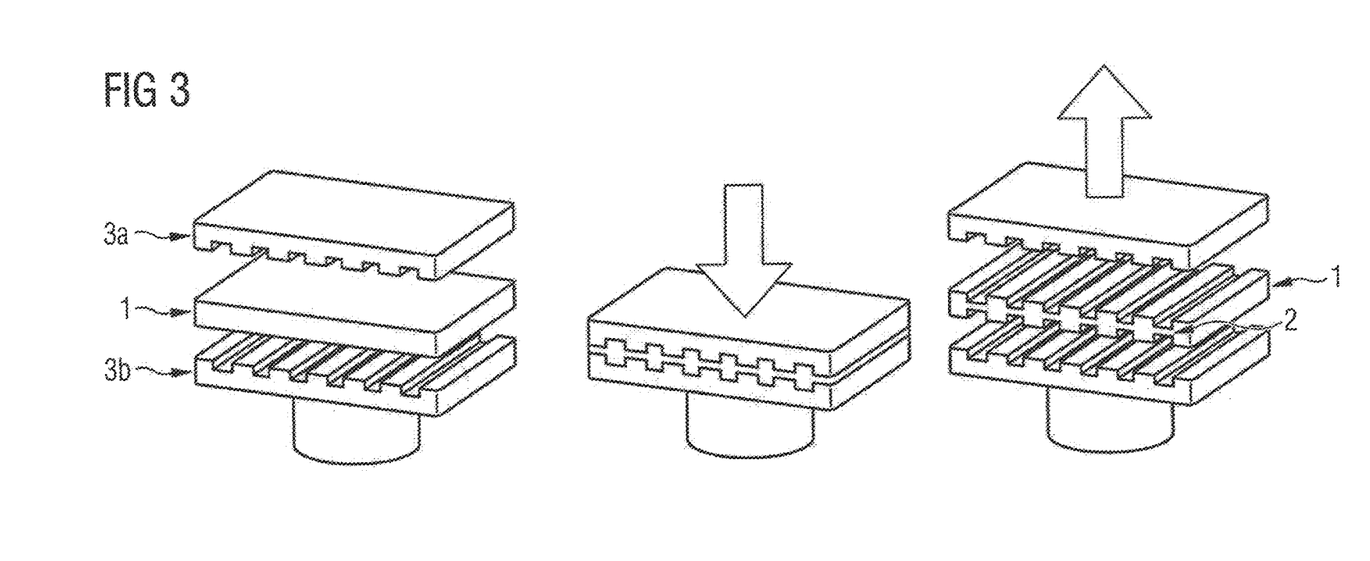
FIG. 3 shows in a perspective view a hot embossing process for producing the structured metal foils.

FIG. 3 shows in a perspective, schematic view a hot embossing process in which microstructures 2 are produced on an electrode foil 1. The hot embossing process may be subdivided into four sub-steps during a reforming process according to the invention for method step B). These method steps are:

B1) heating up the metal foil 1 in particular to the embossing temperature, the embossing temperature preferably being below 400° C., as described further above;

B2) isothermal embossing by pressing the stamping die 3 onto the metal foil 1. During this method step, in particular the temperature of the metal foil 1 is not changed;

B3) cooling down the arrangement comprising the stamping die 3 and the embossed metal foil 1, the pressure being maintained, and B4) demolding the arrangement by opening the stamping die and detaching the embossed metal foil from the stamping die.

In the case of embossing on only one main surface of the metal foil (aluminum electrode foil), a piece of an aluminum foil 1 with a thickness that is greater than the height of the structures to be produced may be positioned on what is known as a substrate plate 3b, the dimensions of the metal foil 1 corresponding approximately to the dimensions of the substrate plate 3b. Subsequently, both the substrate plate and the stamping die 3a, in which the microstructures to be transferred are present, can be heated up to the embossing temperature, for example a temperature of <320° C. As soon as the embossing temperature has been reached, the embossing begins, the stamping die 3a and the substrate plate 3b being moved toward one another at a constant embossing rate until the preset maximum embossing force is reached. The relative movement between the stamping die 3a and the substrate plate 3b is determined by this constant embossing force. During this time, the metal foil 1 flows under the constant pressure. On account of this flowing, the thickness of the metal foil increases the longer it is left in the embossing device. During the embossing process, the temperature is kept constant. It is also possible to apply a vacuum during the isothermal embossing process in order to allow complete filling of the cavities of the stamping die, which is of advantage particularly in the case of static embossing operations with a flat stamping die in order to reduce or avoid the formation of air inclusions between the stamping die and the embossed structures. In the case of dynamic embossing, for example in the case of roll-to-roll embossing processes with rolls as stamping dies, the application of a vacuum is not absolutely necessary because, especially when producing open microstructures at the edge of the metal foils, the air can escape there. After the embossing time has elapsed, the cooling down of the stamping die and the substrate plate begins, while in particular still maintaining the embossing force. After the cooling down, the embossed metal foil is demolded by a relative movement between the substrate plate and the embossed metal foil. During this step, the adhesion of the residual layer of the metal foil on the substrate plate plays an important part. The residual layer is understood here as meaning the thickness of the metal foil that it has after the reforming process. A greater adhesion of the remaining layer on the substrate plate ensures that the microstructures can be demolded in the vertical direction, which reduces the risk of damage. The demolding is the most critical process step of hot embossing. The demolding is particularly important when reducing the structure size in the case of microstructures because of the increasing influence of the shrinkage of the material. Shrinkage may take place in particular in the size range of the structure size of the microstructures, and therefore increases the risk of damage to freestanding microstructures. The effect of the shrinkage is also a function of the process parameters during the embossing process, in particular the embossing force and the embossing temperature. If under hot embossing conditions, that is to say in the embossed state, the metal foil, in particular the aluminum foil, is regarded as a Newtonian fluid, the embossing force can be defined by the following equation for a simple embossing model between parallel plates:

$$F = \frac{3}{2} \frac{\eta \pi R^4}{h_0^3} \frac{dz}{dt}$$

where F is the embossing force, $\eta$ is the viscosity of the material, R is the diameter of the plate, $h_0$ is the thickness of the material to be embossed and $dz/dt$ represents the reforming rate, the rate at which the material of the metal foil flows into the cavities or microstructures of the stamping die. It is clear from these relationships that the embossing force increases both with decreasing thickness and with increasing area of the material to be embossed.

For simple, recurring regular structures in electrode foils, a roll-to-roll production process in particular is very cost-effective as a continuous process in which the electrode foils, the metal foils, are passed between two rotating rolls under pressure, and possibly while being heated to an embossing temperature, so that a continuous embossing operation can be carried out.

Specific drilling through the metal foils can be used to create multi-layered electrodes, for example anode foils, in which for example a central foil is flanked by two further foils on its respective main surfaces. Through the drilled holes, all of the layers of the foils can be wetted with the electrolyte.

Figure 4A:
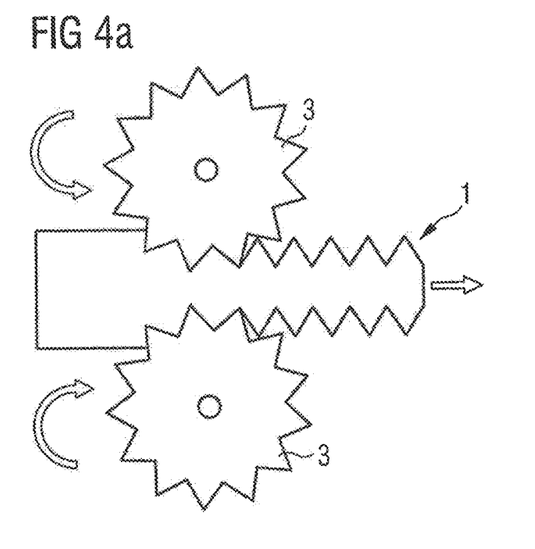
FIG. 4a shows a variant of a method according to the invention as a continuous method, two stamping dies being used as rotating rolls.

Such a continuous roll-to-roll process is schematically shown in cross section in FIG. 4a, two rolls 3 with microstructures 2 rotating against one another and a metal foil 1 being passed through under pressure, the structures 2 being produced particularly easily on the metal foil as an electrode foil. The arrows schematically indicate here the rotation of the roll stamping dies and the movement of the metal foil 1.

Figure 4B:
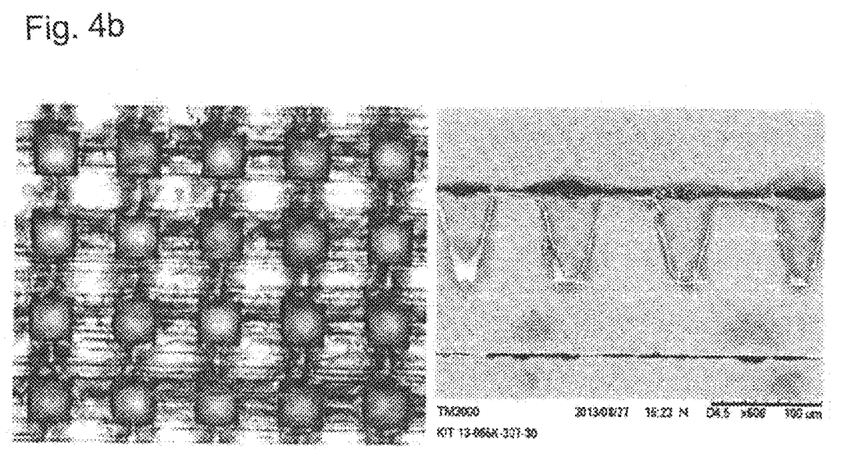
FIG. 4b shows scanning electron micrographs of microstructures which have been produced by means of the embossing process.

FIG. 4b shows scanning electron micrographs of regular microstructures in aluminum electrode foils with a thickness of 120 μm in plan view (illustration on the left) and in cross section (illustration on the right). By contrast with the regular trenches shown in FIG. 2a, here regular depressions with a square cross section are produced in the plan view of the main surface of the metal foil, the cross sections of the microstructures narrowing toward the interior of the electrode foil.

Figure 5:
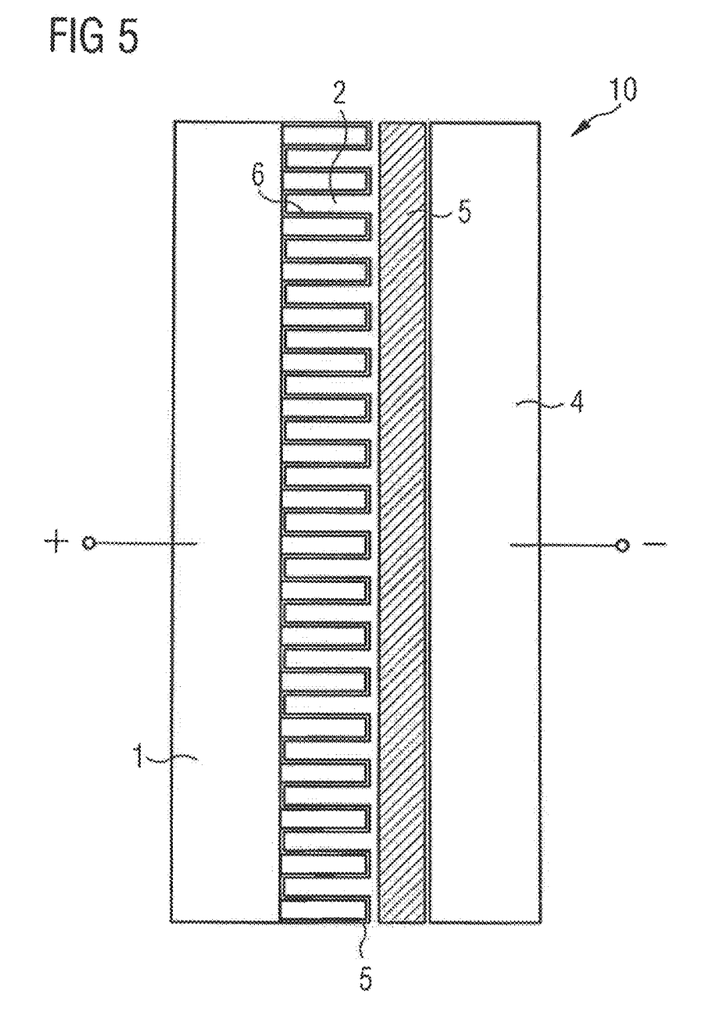
FIG. 5 shows in cross section an aluminum electrolytic capacitor with an electrode foil according to the invention.

FIG. 5 schematically shows in cross section a capacitor, for example an aluminum electrolytic capacitor, in which an electrode foil 1 according to the invention is used. This electrode foil 1 has the already described microstructures 2 as regular trenches and also an oxide layer 5 applied on them as a dielectric. The electrode foil 1 may be used for example as an anode foil. Also provided is a further metal foil 4, which may serve as a current collector. Between this further metal foil 4 and the electrode foil 1 there may be in particular a spacer 7, for example a sheet of plastic or a sheet of paper that is impregnated with an electrolyte 6. With the further electrode foil 4 as a current collector, the electrolyte may act as a counterelectrode to the electrode foil 1, that is to say in particular as a cathode. In this case, the further electrode foil 4 may be designed differently than the electrode foil 1 or else be of the same construction. In particular, the further electrode foil 4 may also be an aluminum foil with a great surface area, although the forming layer does not have to be present.

On account of the increased regular surface area of the electrode foil 1, such electrolytic capacitors have an increased capacitance and increased stability. With the existing technology and using $Al_2O_3$ as the metal oxide layer (dielectric), capacitance values of >0.2 μF/cm$^2$ at a forming voltage of 900 V can be achieved in the case of metal foils, in particular aluminum foils, while the thickness of the metal foils should be <80 μm. In particular, such electrolytic capacitors can also be created particularly easily as electrode coils, in the case of which the electrode foils are unwound from rollers and are subject to higher mechanical stress. On account of their increased mechanical stability, electrode foils according to the invention can be subjected to these roll-to-roll production processes without mechanical damage having to be expected. As an alternative to this roll-to-roll production process, the electrode foils according to the invention may also be used with preference in the case of capacitors that are produced by stacking electrode foils one on top of the other.

Any desired conventional electrolyte solutions may be used as electrolyte solutions for the electrolytic capacitors, in particular aluminum electrolytic capacitors, for example electrolyte solutions that contain ethylene glycol as a solvent and ammonium pentaborate $NH_4B_5O_8$ as a conducting salt. These electrolyte solutions may contain still further additives. Alternatively, electrolyte solutions that at least partially contain water as a solvent may also be used. Electrode foils according to the invention may also be used in the case of capacitors that comprise anhydrous ionic liquids or else, particularly favorably, also solids as electrolytes.

The invention is not restricted by the description on the basis of the exemplary embodiments. Rather, the invention comprises every novel feature and every combination of features, which includes in particular every combination of features in the patent claims, even if this feature or this combination itself is not explicitly specified in the patent claims or exemplary embodiments.

The invention claimed is:

1. A method for producing electrode foils for an electrolytic capacitor, comprising the method steps of:
    A) providing a metal foil for the electrolytic capacitor,
    B) transferring microstructures located on a stamping die to a main surface of the metal foil by a reforming process as part of producing the electrolytic capacitor, the microstructures comprising trenches with an aspect ratio of at least 4:1 being produced, the trenches having a depth of at least 20 μm and a width of 5 μm.

2. The method according to claim 1, the metal foil comprising a valve metal being used in method step A).

3. The method according to claim 1, with a method step C) following the method step B)
    C) producing a metal oxide layer on the metal foil.

4. The method according to claim 1, in method step B) the metal foil being positioned between the stamping die and an additional stamping die and the microstructures located on the two stamping dies being transferred onto the main surfaces of the metal foil by pressing.

5. The method according to claim 1, designed as a continuous process, in method step B) the metal foil being passed between one rotating roll as the stamping die and an additional rotating roll as an additional stamping die and the microstructures thereby transferred onto at least the main surface of the metal foil.

6. The method according to claim 1, in method step B) regular microstructures being produced.

7. The method according to claim 1, in method step B) the stamping die and an additional stamping due being pressed against the metal foil at a temperature of below 400° C.

8. The method according to claim 1, in method step B) the stamping die, and the metal foil and an additional stamping die being pressed against one another with a pressure of 10 to 100 MPa.

9. The method according to claim 1, in method step A) the metal foil with a crystalline texture, for example a cubic texture, of <90% being provided.

10. The method according to claim 1, in method step A) a metal foil with a purity of >95% being provided.

11. The method according to claim 1, in method step A) a metal foil with a thickness of at least 80 μm being provided.

12. The method according to claim 1, in method step B) the microstructures being transferred to the main surface of the metal foil as a multiplicity of depressions.

13. An electrode foil for an electrolytic capacitor, comprising:
    a metal foil with regular microstructures on at least one main surface, the regular microstructures comprising trenches with an aspect ratio of at least 4:1, the trenches having a depth of at least 20 μm and a width of 5 μm, the metal foil being used in the electrolytic capacitor.

14. The electrode foil for capacitors according to claim 13, the metal foil comprising a valve metal.

15. The electrode foil according to claim 13, the metal foil comprising a crystalline (cubic) texture of <90%.

16. The electrode foil according to claim 13, a metal oxide layer being arranged over the microstructures.

17. The electrode foil according to claim 13, the microstructures taking the form of a multiplicity of depressions.

18. An electrolytic capacitor, comprising:
    an electrode foil according to claim 13 as a first electrode,
    a further metal foil as a current collector for a second electrode and
    an electrolyte solution, which is arranged between the first electrode and the current collector of the second electrode.

* * * * *